(12) United States Patent
Zhang et al.

(10) Patent No.: US 11,173,816 B2
(45) Date of Patent: Nov. 16, 2021

(54) AIR CONDITIONER DEVICE FOR A SEAT

(71) Applicant: GENTHERM GMBH, Odelzhausen (DE)

(72) Inventors: Jonathan Zhang, Tianjin (CN); Johannes Grau, Munich (DE); Steve Kang, Troy, MI (US); Marco Ranalli, Augsburg (DE); Martin Adldinger, Holzheim (DE); Dumitru-Cristian Leu, Freising (DE)

(73) Assignee: GENTHERM GMBH, Odelzhausen (DE)

( * ) Notice: Subject to any disclaimer, the term of this patent is extended or adjusted under 35 U.S.C. 154(b) by 204 days.

(21) Appl. No.: 15/219,796

(22) Filed: Jul. 26, 2016

(65) Prior Publication Data
US 2017/0028886 A1 Feb. 2, 2017

(30) Foreign Application Priority Data

Jul. 31, 2015 (DE) .......................... 102015009720.2

(51) Int. Cl.
*B60N 2/56* (2006.01)
(52) U.S. Cl.
CPC ............ *B60N 2/5642* (2013.01); *B60N 2/565* (2013.01); *B60N 2/5657* (2013.01)
(58) Field of Classification Search
CPC combination set(s) only.
See application file for complete search history.

(56) References Cited

U.S. PATENT DOCUMENTS

| 1,370,832 | A | 3/1921 | Mollberg |
| 1,439,681 | A | 12/1922 | Alkire et al. |
| 1,514,329 | A | 11/1924 | Metcalf |
| 2,022,959 | A | 12/1935 | Gordon |
| 2,158,801 | A | 5/1939 | Petterson |
| 2,703,134 | A | 3/1955 | Mossor |

(Continued)

FOREIGN PATENT DOCUMENTS

| DE | 37 05 756 | 10/1988 |
| DE | 19703516 C1 | 5/1998 |

(Continued)

OTHER PUBLICATIONS

Excerpt from website http://www.seatcomfort.com/ventilation.htm, Specializing in Seat Ventilation and Heating Systems, Ventilation, accessed Jun. 10, 2003.

(Continued)

*Primary Examiner* — Steven B McAllister
*Assistant Examiner* — Elizabeth M. May
(74) *Attorney, Agent, or Firm* — The Dobrusin Law Firm, P.C.

(57) ABSTRACT

The present teachings relate to an air conditioner device with at least one ventilation device, which has at least one fluid transport device and at least two fluid exchange devices, wherein the fluid transport device has at least two attachment openings, of which one is a fluid inlet and one additional a fluid outlet. Provision is made that in at least one operational state at least a first fluid exchange device is attached to a fluid inlet of a fluid transporting device and a second fluid exchange device is attached to a fluid outlet of a fluid transporting device.

15 Claims, 5 Drawing Sheets

(56) References Cited

U.S. PATENT DOCUMENTS

| | | | |
|---|---|---|---|
| 2,758,532 A | 8/1956 | Awe | |
| 2,791,956 A | 5/1957 | Guest | |
| 2,826,135 A | 3/1958 | Benzick | |
| 2,992,604 A | 7/1961 | Trotman et al. | |
| 2,992,605 A | 7/1961 | Trotman et al. | |
| 3,030,145 A | 4/1962 | Kottemann | |
| 3,101,037 A | 8/1963 | Taylor | |
| 3,101,660 A | 8/1963 | Taylor | |
| 3,127,931 A | 4/1964 | Johnson | |
| 3,131,967 A | 5/1964 | Spaulding | |
| 3,162,489 A | 12/1964 | Trotman | |
| 3,529,310 A | 9/1970 | Olmo | |
| 3,653,590 A | 4/1972 | Elsea | |
| 3,684,170 A | 8/1972 | Roof | |
| 4,043,544 A | 8/1977 | Ismer | |
| 4,072,344 A | 2/1978 | Li | |
| 4,509,792 A | 4/1985 | Wang | |
| 4,589,656 A | 5/1986 | Baldwin | |
| 4,777,802 A | 10/1988 | Feher | |
| 5,160,517 A | 11/1992 | Hicks et al. | |
| 6,068,332 A | 5/2000 | Faust et al. | |
| 6,145,925 A | 11/2000 | Eksin et al. | |
| 6,164,719 A | 12/2000 | Rauh | |
| 6,186,592 B1 * | 2/2001 | Orizaris | B60N 2/5635 297/180.12 |
| 6,277,023 B1 * | 8/2001 | Schwarz | B60N 2/5635 297/180.14 |
| 6,604,785 B2 * | 8/2003 | Bargheer | B60H 1/00285 297/180.14 |
| 6,619,736 B2 | 9/2003 | Stowe et al. | |
| 6,629,724 B2 | 10/2003 | Ekern et al. | |
| 6,676,207 B2 | 1/2004 | Rauh et al. | |
| 6,786,541 B2 | 9/2004 | Haupt et al. | |
| 6,857,697 B2 | 2/2005 | Brennan et al. | |
| 6,869,140 B2 | 3/2005 | White et al. | |
| 6,893,086 B2 | 5/2005 | Bajic et al. | |
| 6,976,734 B2 | 12/2005 | Stoewe | |
| 7,201,441 B2 | 4/2007 | Stoewe et al. | |
| 7,213,876 B2 | 5/2007 | Stoewe | |
| 7,338,117 B2 | 3/2008 | Iqbal et al. | |
| 7,370,911 B2 | 5/2008 | Bajic et al. | |
| 7,475,938 B2 | 1/2009 | Stoewe et al. | |
| 7,478,869 B2 | 1/2009 | Lazanja et al. | |
| 8,888,573 B2 * | 11/2014 | Bajic | B60N 2/5635 297/180.1 |
| 2005/0067862 A1 | 3/2005 | Iqbal et al. | |
| 2005/0093347 A1 | 5/2005 | Bajic et al. | |
| 2006/0138810 A1 | 6/2006 | Knoll et al. | |
| 2007/0004042 A1 | 1/2007 | Gao et al. | |
| 2007/0101729 A1 | 5/2007 | Aoki et al. | |
| 2010/0327636 A1 * | 12/2010 | Stoll | B60H 1/00285 297/180.1 |
| 2012/0080911 A1 | 4/2012 | Brykalski et al. | |
| 2013/0300179 A1 * | 11/2013 | Ota | B60N 2/5664 297/452.42 |
| 2018/0022252 A1 * | 1/2018 | Arata | B60N 2/56 297/452.42 |

FOREIGN PATENT DOCUMENTS

| | | |
|---|---|---|
| DE | 19846090 A1 | 4/2000 |
| DE | 19851209 C1 | 4/2000 |
| DE | 19851979 C2 | 5/2000 |
| DE | 10144839 | 3/2003 |
| DE | 102007039422 A1 | 2/2009 |
| DE | 202012010708 U1 | 11/2012 |
| EP | 0 280 213 | 8/1988 |
| EP | 1266794 | 12/2002 |
| EP | 1323573 | 7/2003 |
| JP | H01310689 A | 12/1989 |
| JP | 2007126047 A | 5/2007 |
| JP | 2010000253 A | 1/2010 |
| JP | 2010052494 A | 3/2010 |
| JP | 2011-162063 A | 8/2011 |
| WO | 96/05475 | 2/1996 |
| WO | 02/053410 | 7/2002 |
| WO | 05/021320 | 3/2005 |
| WO | 2005/065987 A2 | 7/2005 |
| WO | 2005/073021 A2 | 8/2005 |

OTHER PUBLICATIONS

GMT 830 Heating & Ventilation System, IGB Automotive Ltd., received by Assignee W.E.T. Automotive Systems, Jun. 2003.

Specializing in Seat Ventilation and Heating Systems, Seat Comfort Systems, http://www.seatcomfort.comsemashow1.htm, Jun. 10, 2003.

* cited by examiner

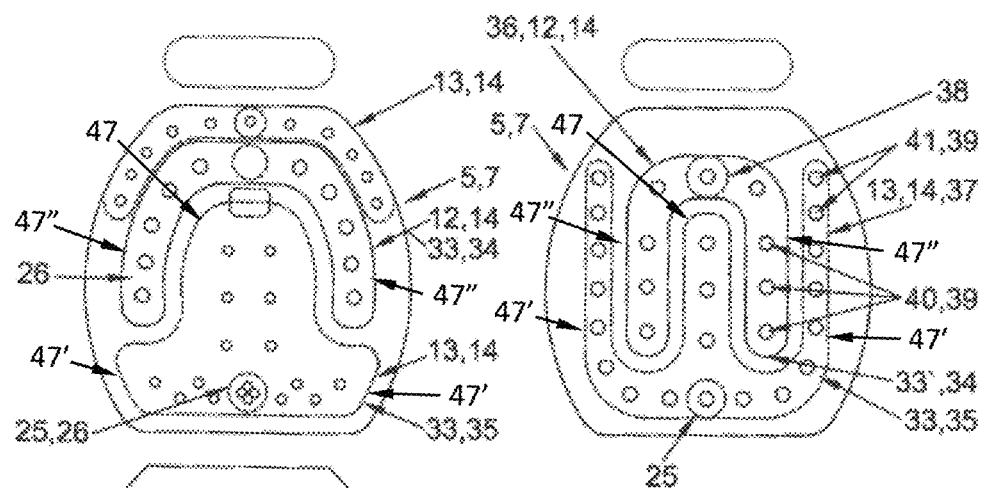
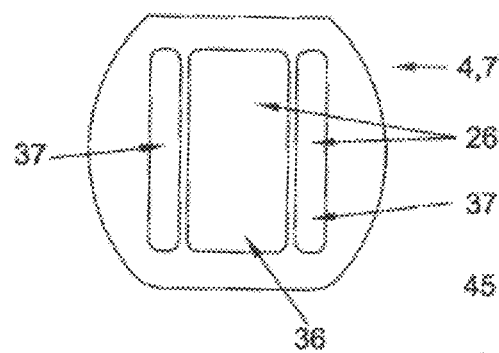
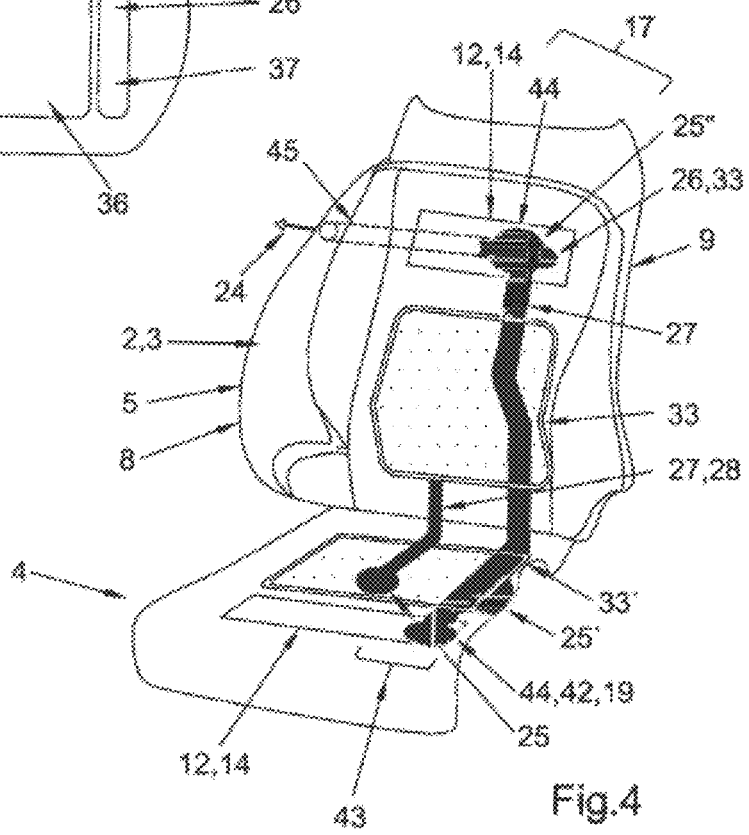

AIR CONDITIONER DEVICE FOR A SEAT

The present teachings are applicable to vehicles, air conditioner controlled systems, air conditioner devices, heaters, vehicle seats, a ventilation device, a collector device, a temperature control device, or a vehicle with at least one feature described in this document. In addition, the present teachings relates to a method for manufacture and operation of an air conditioner device.

BACKGROUND

DE19851209 C1, DE 1985 1979 C2, and 19703516 C1, all of which are incorporated by reference herein for all purposes, disclose ventilated vehicle seats in which air enters into the seat from a rear side of a bolster, provides rear ventilation of a seat surface there, and then emerges from the seat at a location distant from this seat surface. These embodiments avoid passage of air through the covering of the seat to a passenger.

DE 102007039422 A1, which is incorporated by reference herein for all purposes, shows a ventilated vehicle seat in which air enters into the seat from a rear side of an bolster, penetrates its seat surface and then emerges on the opposite side. By this means, a passenger gets in direct contact with moving air. With this seat, the flow direction of the fans can be reversed, so as not to cause a patient discomfort in an initial phase with heated air from the seat.

DE 19846090 A1, which are incorporated by reference herein for all purposes, shows a ventilated vehicle seat, in which air comes by suction from rear side of a bolster. Wake-mode air can flow both through a seat cover and also through an opening in the rear side of the seat. By this means, simultaneously there is a rear ventilation and a circumcirculation of a passenger with air brought in by suction.

WO 2005/073021 A2 and WO 2005/065987 A2, all of which are incorporated by reference herein for all purposes, show seats in which on the one side air is brought out by suction from the surrounding environment of a passenger, and simultaneously cooled air behind a seat cover is guided along, to take up excess heat from a seat cover and then to take both air flows downward and away from the seat surface.

SUMMARY

Some applications require alternative or improved properties in regard to their manufacturing costs, their suitability for generating a pleasant climate or their stability.

The present invention relates to one of the subjects named at the outset in connection with at least one of the features named in this specification or in the claims. This especially contains a technical concept with the features of claim 1. Additional advantageous embodiments relate to the subjects of the additional claims.

BRIEF DESCRIPTION OF THE FIGURES

In what follows, the particulars of the invention are explained. These implementations should make the invention understandable. They are, however, merely of an exemplary nature. Naturally, within the scope of the invention defined by the claims, individual or multiple described features can also be deleted, altered or supplemented. Also, the features of various embodiments can naturally be combined with one another. If one feature is to be at least partially implemented, this includes that this feature is also implemented in full, or essentially in full. What is decisive is that the implementation permits attainment to a perceptible degree of the desired utility, for example that a corresponding feature is implemented at least to 50%, 90%, 95% or 99%. If a minimum amount is indicated, then understandably more than this minimum amount can also be used. What is described for one object, can also be applied to a predominant extent, or in totality, to other generic objects. If nothing else is indicated, intervals enclose their edge points. In what follows, reference is made to:

FIG. 4 is a perspective view of a third embodiment of a seat of a vehicle from FIG. 1 with invention-specific air conditioner device.

FIG. 5 is a schematic top-down view of a fourth embodiment of seatback and seat bolster.

FIG. 6 is a schematic top-down view of a fifth embodiment of the seatback.

TERMS

"In essence" means a degree of correspondence in which a feature is implemented to such an extent that it also permits realization of a utility expected from the feature to a perceptible degree. This especially may mean that such a feature is implemented to at least 50%, 90%, 95% or 99%. If a minimum amount is indicated, then naturally more than this minimum amount can be used. If the number of a component is indicated with at least one, then this also includes embodiments with two, three or some other multiplicity of components. What is described for one object can also be applied for the predominant part of the totality of all other generically identical objects. If nothing else is indicated, intervals enclose their edge points.

"one" means an indefinite article and is to be understood as "at least one," if it is not clear that "a single" is described.

"or" means at least one of the options given is selected or implemented. This includes that also.

multiples of, or all of, the listed possibilities are implemented, thus in the meaning "and." If "or" is meant as an express declining of a non-selected option, this would be here expressly indicated, for example as "either-or."

DESCRIPTION

Figure 1:
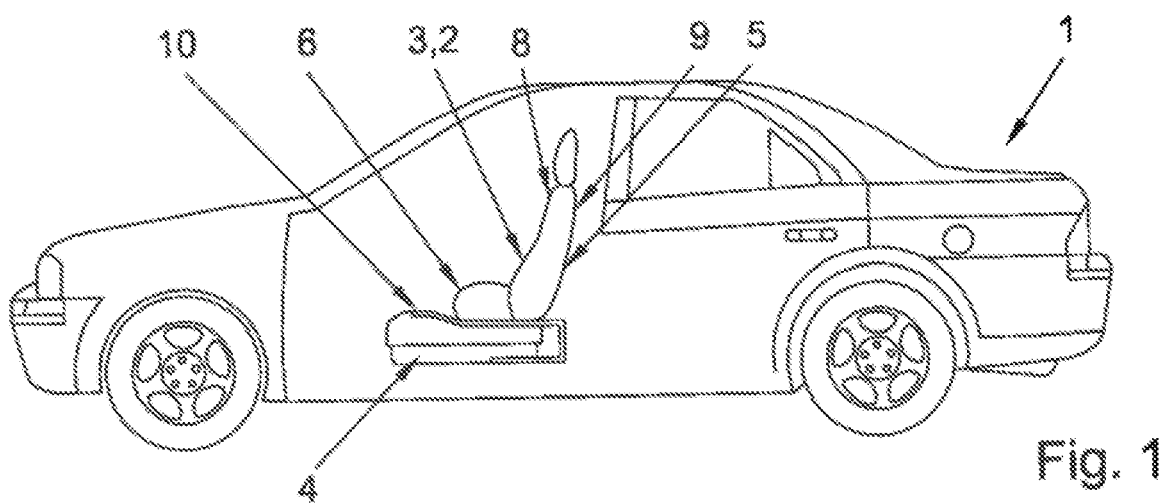
FIG. 1 is a vehicle with air-conditioned interior device objects in a partial longitudinal section.

The invention relates, among others, to a vehicle 1. Vehicle means a device for transport of persons or freight. This especially includes land, water, road, rail or airborne vehicles, especially airplanes, ships and automotive powered vehicles (FIG. 1). Preferably, at least one vehicle has at least one body support device 2, especially a vehicle seat 3, a seat back or an arm rest 6.

Vehicle-bound means installed in fixed fashion in a vehicle or provided for operation therein.

Body support device means a device that supports a person, especially seats, benches or beds, especially for vehicles. Preferably at least one body support device has at least one seat cushion, a recliner back, a bolster, an air conditioner zone or a fluid exchange zone.

Vehicle seat means a seat for a vehicle. Preferably at least one vehicle seat has at least one bolster 7, a cover 10, a seat cushion 4, a seatback 5, a head rest or an arm rest 6.

Seat cushions means a section of the seat that serves to carry the buttocks of a user.

A seatback means a section of the seat that serves to support the back of a user.

Arm rest means a device for support of the lower arm or of a wrist. Examples are arm rests on a center console or on a vehicle door.

Bolster means a device for absorption of shocks or for distribution of local peak pressures to a larger area. Examples are blocks made of polyurethane foam. Preferably at least one bolster 7 has at least one A side 8, a B side 9, an air conditioning zone 12, a cover 10 or an anchoring trench 11.

A side means a side of a seat cushion or a seat back that faces a user.

B side means a side of a seat cushion or a seat back that faces away from a user.

Cover means a flat article that is placed at least in sectioned fashion on the surface of an object. Examples are translucent or opaque layers which contain perforated or unperforated leather or textiles, and are arranged on a bolster, or skins which cover at least part of a surface of a foam like material. The invention is especially suited for perforated leather, because here a higher temperature control requirement exists and the perforation makes possible a direct air exchange between the seat and the user.

Anchoring trench means a border zone at which multiple sections of a bolster, or multiple bolsters, border on each other and on the one cover at least one section or bolster has at least one anchoring.

Anchoring means a pointwise or elongated recess in a bolstered surface, where the bolstered surface of a bolster or its cover exhibits a lower height level at least vis-à-vis an adjoining area. Examples are seam areas of a cover, where the cover is drawn in by means of a sewed-on removal device into a bolster surface, in order to attach the cover onto a seat rack.

Air conditioning zone means a zone which is to be affected in regard to an air conditioning parameter, thus is subject to a controlling or regulation, especially to bring it to a specific target value or in a target range, at least briefly, or to keep it there for a lengthy period. Examples are surfaces with which a user, at least potentially, when using the object, can come into contact. This especially includes sections of a vehicle seat surface, especially A-side oriented sections of a cover. This especially includes a moderate cooling zone 13, a high cooling zone 14, a moderate heating zone 15 or a high heating zone 16. Preferably at least one conditioner zone has at least one fluid exchange device 33, 33'.

Moderate cooling zone means an air conditioning zone which in at least one operating state is cooled only moderately, or not at all, while at least one high cooling zone is in cooling operation. Examples are areas which the neck, kidneys or the coccyx of a passenger adjoin. This especially comprises a strip of 5, or better, 10 cm width along the point of contact of seat cushion and seatback, a strip of 1-4 cm width along the anchoring trenches, which run along a body axis of a passenger. Especially preferred is reduction in the number or size of fluid exchange openings in a moderate cooling zone, vis-à-vis a high cooling zone. Especially preferred is totally doing way with fluid exchange openings in a moderate cooling zone.

High cooling zone means an air conditioning zone, which at least in one operating state serves for high cooling of a passenger. Rapid and high cooling is especially desired here. Examples are areas of a seat surface that adjoin shoulders or thighs.

Moderate heating zone means an air conditioning zone that at least in one operating state serves for moderate heating of a passenger. High heating is not desired here. This especially includes zones of a seat cushion, which correspond to the pace of a user.

High heating zone means an air conditioning zone which, at least in one operating state, serves for high heating of a passenger. Rapid and high heating is especially desired here. Examples are moderate cooling zones.

Air conditioning parameters means a climatic quantity, for example temperature, atmospheric humidity, atmospheric composition or fluid flow rate.

In addition the invention relates to an air conditioner controlled system. Air conditioner controlled system means an object, which is to be affected in regard to at least one air conditioning parameter, thus is subject to a controlling or regulation, especially to bring it, at least briefly to a specific target value or in a target range, or to keep it there for a lengthy period. This is preferably valid for a target zone, thus such parts of its surface with which a medium according to the purpose or with which a user potentially, while using the object, can come into contact. For example, an air conditioner controlled system is a vehicle seat, an arm rest, a door paneling or another interior component of a vehicle. Preferably at least one air conditioner controlled system has at least one bolster, one cover or one air conditioner device 17.

A target zone is a planar or three-dimensional area that is to be temperature-controlled, especially an air conditioner zone. This especially includes an inner area of an intake device, products admitted therein, or the surroundings of the temperature controlling device.

Air conditioner device means an object which is suited to affect a controlled system in regard to at least one air conditioning parameter, especially to bring it to a specific target value or in a target range, at least briefly, or to keep it there for a lengthy period. This makes possible a tempering, ventilation, moisturizing or moisture removal, or air conditioning. Especially suitable are the tempering or air conditioning of a seat during more lengthy car trips, or pre-tempering of fuel. Also, heating of a passenger neck area through an outflow of warm air is possible. Preferably at least one air conditioner device has at least one ventilation device 20 or a tempering device 18.

A tempering device is a device for tempering at least one target zone, especially in order to do the following to the temperature of this target zone:

a) alter it vis-à-vis its initial state, or b) keep it at a target temperature, or c) temper it by a target difference that deviates from an ambient temperature.

Examples are heaters 42, coolers 19, thermoelectric devices 44 such as Peltier elements, a temperature monitoring device, a conductor cord or a coil.

A cooler 19 is a device for cooling a target zone. Examples are thermoelectric devices, especially TED modules 43.

A ventilating device is a device that can be used for specific alteration of the air composition or of the air flows in a certain planar or three-dimensional area, for example an on-board air conditioner, at least partially air-permeable spacer media, spacer textures or air conditioner inserts. Examples are the ventilation of at least one air conditioner controlled system, for example of a surface of an object, especially for demoisturizing or tempering of surfaces of an air conditioner controlled system close to persons or touched by persons. At least one ventilation device preferably has at least one fluid distributor layer, a fluid transporting device 25, a fluid exchange device 33, 33' or a fluid guidance device 26.

Fluid transporting device means a device for transport of a fluid, especially axial or radial fans or compressors for air or pumps for water. A fluid transporting device has at least two attachment openings, preferably each with a fluid channel attachment 38. At least one of these is a fluid inlet, at least one additional one is a fluid outlet. Inlet and outlet relate to their function in relation to an operational space of the fluid transporting device. Especially preferred is a position and embedding in which the fluid transporting device at least partially, or with the exception of its attachment openings, is fully screened off from its surroundings by an acoustic protection device. This especially includes that the fluid transport device has no intake or blowout opening to the rear side or underside of a seat.

Fluid guidance device means a device which can direct a fluid transported by a fluid transport device to at least one fluid exchange device or in the reverse direction. This especially includes a planar, bendable or creasable channel. Preferably at least one fluid guidance device has at least one spacer device 23, one connection line 27, a fluid channel attachment 38, a fluid exchange opening 39, a channel segment, a sheathing device 22 or a free space 21.

Connection line means a fluid guidance device, which connects a fluid exchange device at least for a time with a suction opening of a fluid transport device. This makes possible exchange of fluid from the fluid exchange device and the fluid transport device. Examples are suction intake lines 28 or blowout lines 29.

Suction intake line means a connection line which at least for a time connects a fluid exchange device with a suction intake opening of a fluid transport device. This makes it possible to direct fluid from the fluid transport device to the fluid exchange device.

Blowout line means a connection line which at least for a time connects a fluid exchange device with a blowout opening of a fluid transport device. This makes it possible to direct fluid from the fluid transport device to the fluid exchange device.

Free space means an at least partially open space which can admit air and through which it can move. This makes possible delivery of air to, or a removal of air from, a target zone to be tempered.

Sheathing device means a device which restricts air in the air guidance device from emerging at an undesired location from the air guidance device. Examples are a flat object with shares of fleece or foil, especially a composite of these materials.

Spacer device means a device which can keep open a free space for fluid 24 passage, even if the surroundings of this free space are subjected to mechanical loads. Examples are spacer textures, knub foils, burled foam, open-cell foam or spring-action spirals situated in the free space.

A fluid is a material without a solidly composed form, especially in the form of gas, vapor or granulate, or in a fluid state, or a form which is a mixture of one or more of these modifications. Examples are water, air or fluid coolants.

A flow modifier is a device which has an effect on the direction or transported volume of a fluid flow exchanged between a fluid exchange device and a fluid transport device, or the share of a fluid flow, which is made available from one of the devices to the other. This makes possible an individual setting of the fluid flow-through of individual fluid exchange devices or their transport device. Examples are valves or shutoff cocks, intake modifiers or blowout modifiers. This especially includes throttle valves, by which a fluid flow can at least partially be reduced or at least partially be switched over to other flow paths. Preferably at least one flow modifier is provided between a fluid exchange device and a fluid transport device. This especially includes a connection line.

Suction intake modifier means a flow modifier which is assigned to a suction intake line, to modify the fluid flow in the intake suction line.

Blowout modifier means a flow modifier which is assigned to a blowout line, to modify the fluid flow in the blowout line.

A fluid exchange zone 30 is an air conditioner zone of a surface of a vehicle seat which faces toward a passenger, at which the vehicle seat or an air conditioner device exchanges air with the surroundings of the passenger, to increase the climatic comfort of the passenger. Examples are areas of a seat surface adjoining the shoulders or thighs. This especially includes a fluid blowout zone 31 or a fluid suction intake zone 32.

A number of fluid exchanges zones is provided, which makes it possible to optimally air-condition a user, especially as regards locally differing required heating or cooling power or regarding locally differing target temperatures. This makes possible an optimal air conditioning with great comfort and efficient use of available energy. Examples are two air exchange zones per seatback or per seat bolster, wherein their target temperature, their tempering performance, their air throughput, their air throughput per surface, their switched state or their air transport device differs from each other.

In addition, a number of fluid exchange zones is provided, which cause as rapid a change in temperature to be perceptible to a user. Examples are two air exchange zones per seat or per seat bolster, wherein, in a first operational state, an air exchange zone takes priority vis-à-vis the second air exchange zone regarding heating, cooling and ventilation. This especially includes that a first air exchange zone in a first operational mode has a higher tempering performance or a higher air throughput relative to a second air exchange zone, than in a second operational state.

Fluid blowout zone means a fluid exchange zone from which air emerges from an air conditioner device or a vehicle seat. This makes it possible to have pre-tempered air flow at a passenger. This is especially of dual advantage for cooling. Because by this means, the passenger experiences on the one hand convectively cooled air. In addition, direct flow causes a cooling through evaporative cooling. Examples are areas where higher cooling is pleasant, or for physiological reasons harmless, where a passenger is at a distance from a seat surface, or where a bolster surface turned toward the user is impinged on with a comparatively small pressure loading, especially in the area of shoulder or neck bolsters or areas close to the knee of a thigh bolster. A number is provided, with which both a seatback and a seat bolster are sufficiently supplied. Examples are one fluid blowout zone per seat bolster or per seatback bolster. The surface provided permits an efficient and sound tempering. Examples are, at maximum, half of the A side of a seat, especially at maximum half of the surface of all fluid exchange zones of a seat or of a ventilation device, especially at maximum 40% of the named surfaces, especially at maximum 20%, especially at maximum 10% thereof.

A fluid suction intake zone is a fluid exchange zone into which air enters from the surroundings in an air conditioner device or a vehicle seat. This permits undesired tempered or moist air to be brought out of the surroundings of a passenger by suction. Simultaneous blowout and suction intake has a dual advantage especially with cooling. Because through the cold impingement the passenger is directly cooled by means of tempered air. In addition, through outward suction, there is a wake of dry air, and thus further cooling through evaporative cooling. In addition, it makes it possible to again bring in preconditioned air, already ejected from a fluid blowout zone, by suction, recondition it with a relatively small expenditure of energy and again supply it to a user. Examples are areas where a cooling should not be too high, for example at the coccyx or kidneys, where the passenger is pressing relatively strongly on the seat, for example at the ischial bones or in the lordosis area. What is provided is a fluid flow-through that at least locally is placed lower than in a combined-action fluid blowout zone, so that the flow rate, and thus a cooling action on the passenger is less than in a fluid blowout zone. What is provided is a number with which both a seatback and also a seat bolster are sufficiently supplied. Examples are one fluid suction intake zone per seat bolster and seatback bolster. The surface provided permits efficient and sound tempering. Examples are at least half of an A side of a seat, especially at least half of the surface of all fluid exchange zones of a seat or of a ventilation device, especially at least 60% of the named surface, especially at least 80%, especially at least 90% thereof.

Figure 3A:
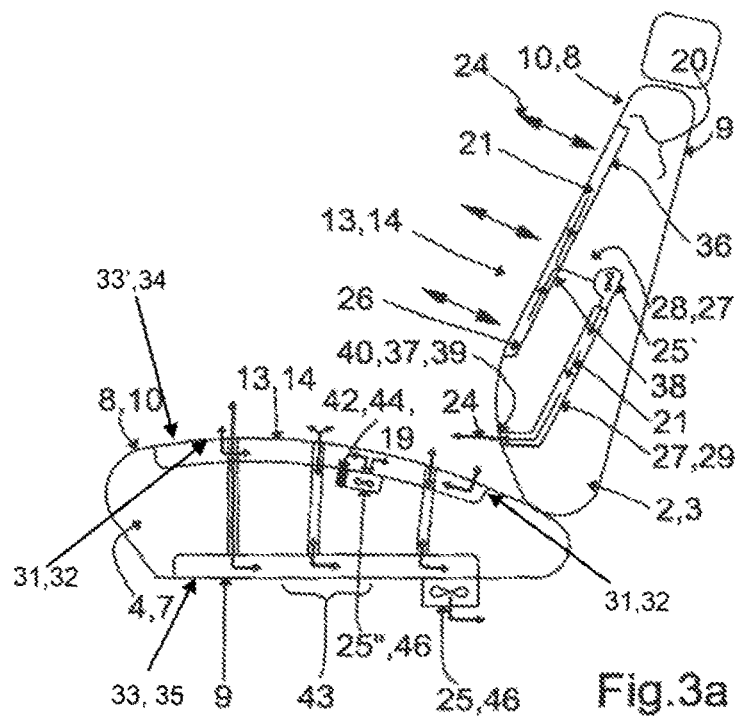
FIG. 3A is a longitudinal section through a second embodiment of a seat of a vehicle from FIG. 1 with invention-specific air conditioning device.
Figure 3B:
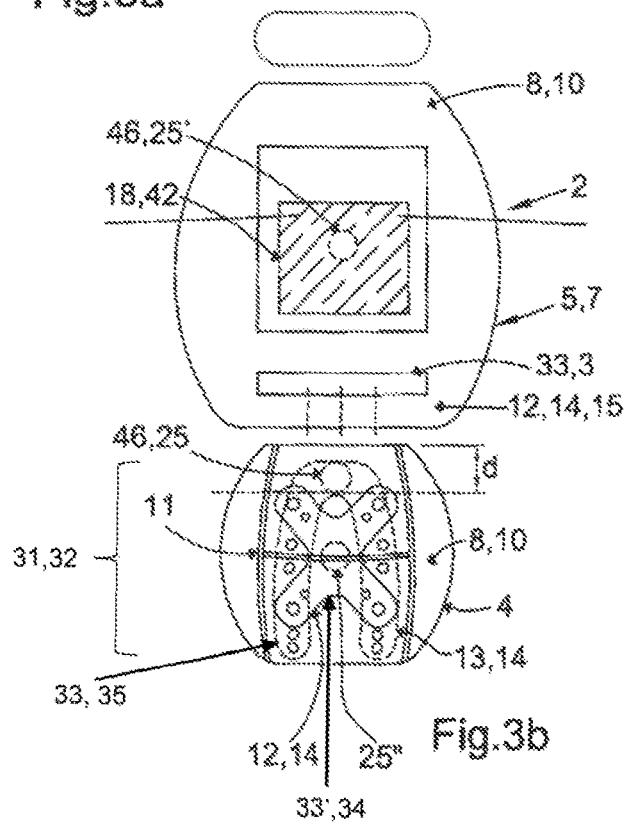
FIG. 3B is a schematic top-down view of seatback and bolster of a seat from FIG. 3A.
Figure 7:
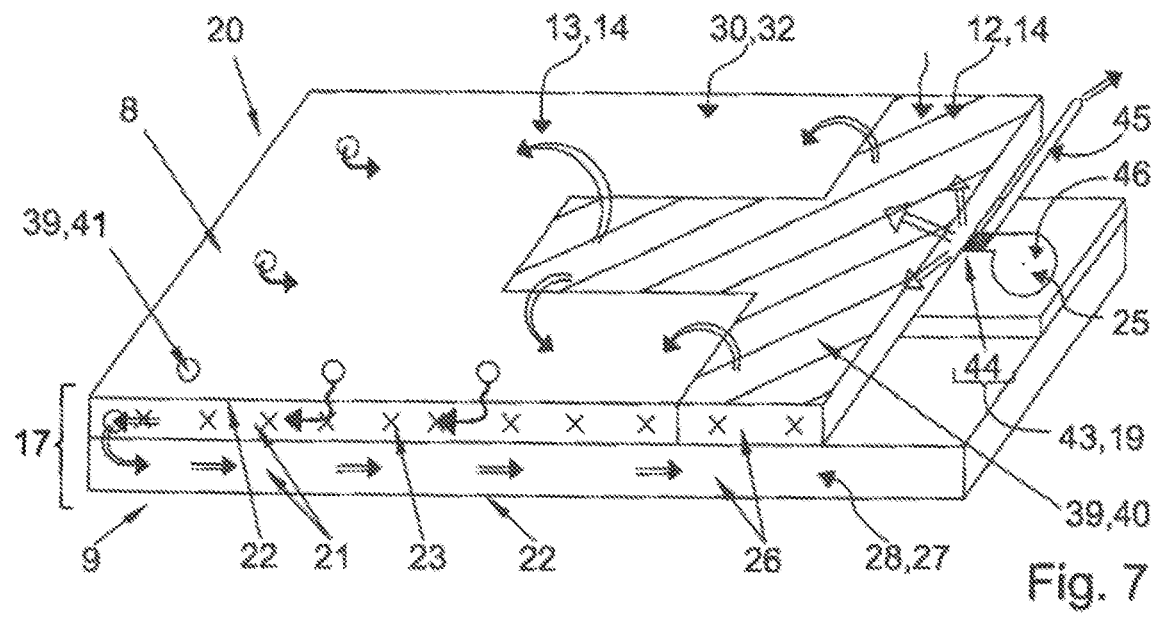
FIG. 7 is a perspective first embodiment, longitudinal section, of a modular air conditioner device.
Figure 8:
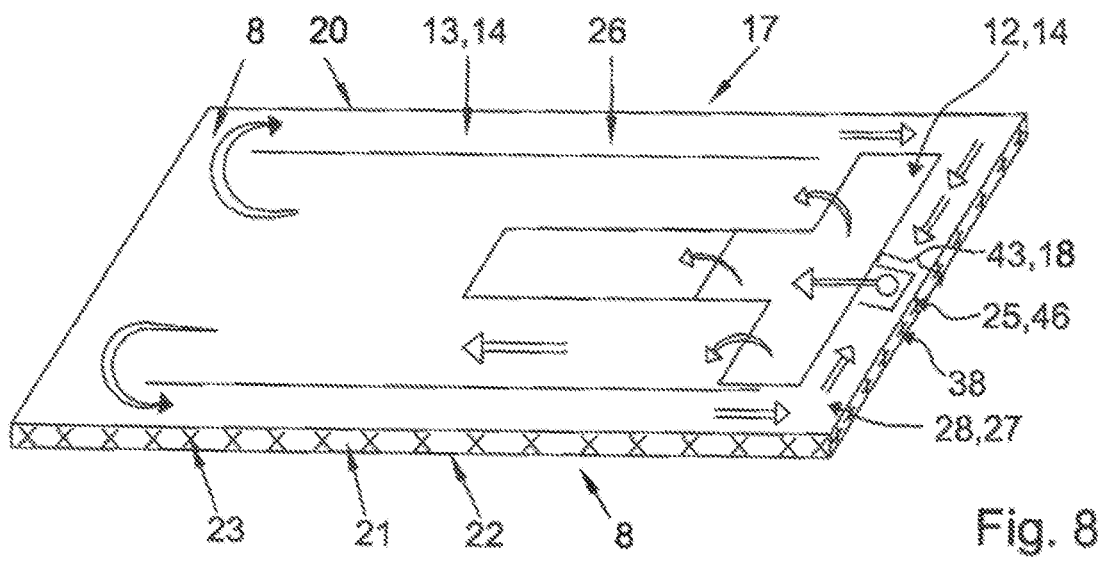
FIG. 8 is a perspective second embodiment, longitudinal section, of a modular air conditioner device.

Fluid exchange device 33 means a device for arrangement in a fluid exchange zone for exchange of fluid between the surroundings of a passenger at a fluid exchange zone and a ventilation device. Examples are planar modules with a spacer layer, for example, made of spacer fabrics, with or without a sheathing device, or planar hollow bodies, especially those made of rigid-walled polymeric material. This especially includes a fluid ejection device 34, a fluid intake device 35, a fluid collector 36 or a fluid distributor 37. Their number preferably matches the number of fluid exchange zones. Preferably at least one TED is provided on the A side or B side on a bolster beneath a cover. This especially means embedded in a recess on a surface of a bolster or placed on a bolster, wherein the surrounding areas of the bolster are covered by additional fluid exchange devices or compensation bolsters. The fluid exchange device 33 may include one or more conduits 47. The one or more conduits 47 may form an X-shape (FIG. 3B), T-shape (FIGS. 5, 7, 8), U-shape (FIGS. 5, 6), or W-shape (FIG. 6). A first fluid exchange device 33 may include a first conduit 47. The first fluid exchange device 33 may include two additional conduits 47'. A second fluid exchange device 33' may include two second conduits 47". The two second conduits 47" may be spaced apart. What is appropriate is a form with which the air is exchanged at all the requisite positions, but also only there, if possible. This especially includes operating along linear-shaped (FIG. 5), elongated zones along a body, for example, along the thigh. This in addition includes U-shapes (FIGS. 3B, 5, 6) along two elongated zones with a fluid transport device, for example along the thigh or along both sides of the spinal column. This also includes X-shapes (FIG. 3B), for operation throughout a wider area, for example a central area of a seat cushion or a seatback bolster, with which both a seatback and a seat bolster can be sufficiently supplied. This also includes T shapes (FIG. 7, 8) for operation with higher cooling in segments with a wider area, for example the shoulders, and in another area to leave lateral areas out, for example in the lordosis area only the spinal column and not the kidneys. The T shape also is suitable with a suction removal of fluid (FIG. 5), to simultaneously operate in zones to be cooled more moderately, for example at the kidneys and spinal column. This additionally includes W shapes or triple-dovetailed forked ones (FIG. 6), to simultaneously serve three tempering zones running parallel to each other, for example the two lateral edges of seatbacks and a spinal column section placed longitudinally in the middle. In particular, the shape of a fluid exchange device can match the shape of a fluid exchange zone. Also, the size of a base of a fluid exchange device can correspond to the base size of a fluid exchange zone. Especially the surface relations of the fluid exchange device can match the principles described for the fluid change zones. Preferably at least one fluid exchange device has at least one spacer layer, for example of spacer fabric or spacer spirals, and at least one sheathing device, for example a sheath made of fleece or foil or a composite of the two.

Fluid exchange device means a device for exchange of fluid between the air guidance device and a zone to be ventilated of an air conditioner controlled system, an environment, an air conditioner controlled system, or a user.

Fluid ejection device means a fluid exchange device for ejection of fluid from a fluid blowout device toward a passenger. Preferably at least one fluid ejection device is provided on the A side, to move tempered air as directly as possible to the passenger.

Figure 2A:
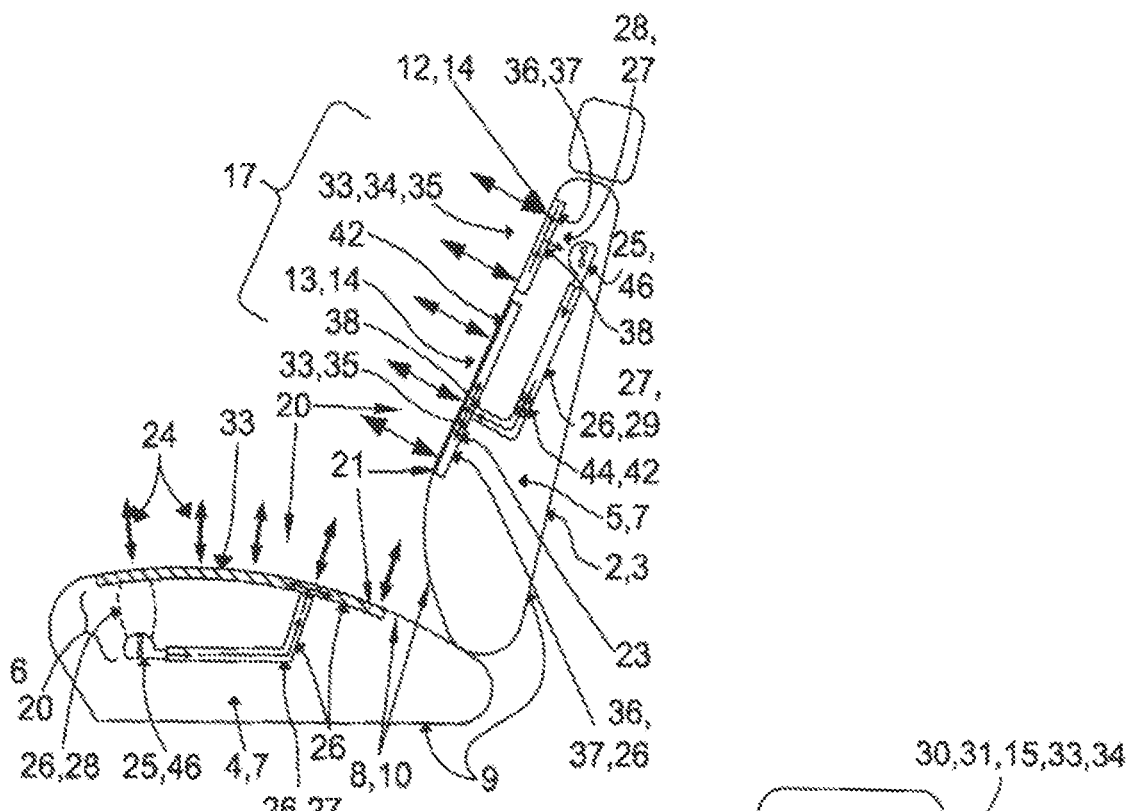
FIG. 2A is a longitudinal section through a first embodiment of a seat of a vehicle of FIG. 1 with an invention-specific air conditioning device.
Figure 2B:
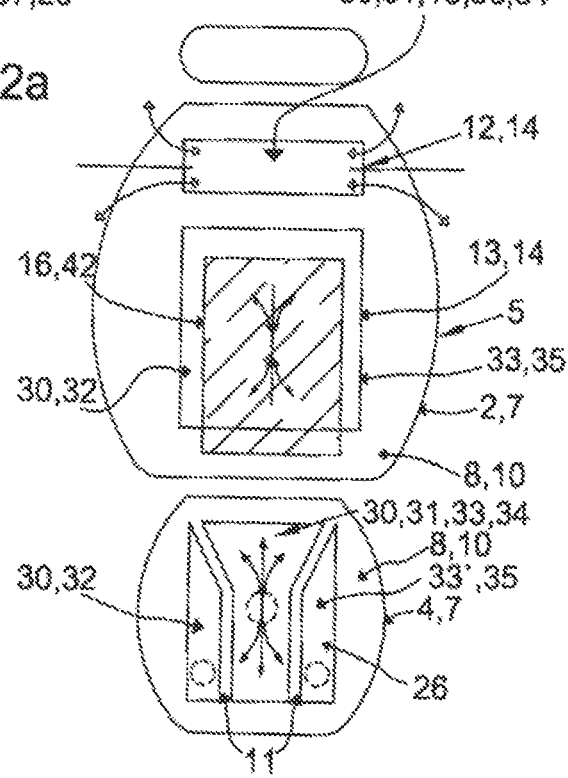
FIG. 2B is a schematic top-down view of a seatback and bolster of the seat from FIG. 2A, passenger's view.

Fluid intake device means a fluid exchange device for taking in fluid by suction from an environment of a passenger, into a fluid intake zone. Preferably at least one fluid intake device is provided on the A side and on the same plane as a fluid ejection device (FIGS. 2, 8) to avoid thick bolster cushions. Preferably at least one fluid intake device is provided beneath a fluid ejection device (FIGS. 4, 7) to be able to be more free in configuring a fluid intake zone and a fluid ejection zone, and if necessary to arrange to overlap or cross each other.

Fluid collector means a fluid exchange device for arrangement on a fluid intake zone for intake by suction of fluid into the fluid intake zone, and for further transport to an ejection line. A number is appropriate with which both a seatback and a seat bolster are sufficiently supplied. This especially includes one fluid collector for each seat bolster and seatback bolster. Preferably at least one fluid collector is provided on the B side and connected via perpendicular air channels in a bolster with the A side. This permits full functionality of the fluid collector with simultaneous optimal function of a fluid distributor. A form is appropriate that makes possible low flow resistance and simplified assembly. This especially includes a U-shaped air direction layer sheathed in fleece or foil.

Fluid distributor means a fluid exchange device for arrangement in a fluid blowout zone for distributing fluid from a blowout line of a fluid transport device along the fluid blowout zone and then ejecting the fluid at a passenger. A number is appropriate with which both a seatback and a seat bolster are sufficiently supplied. This especially includes one fluid distributor for each seat bolster and each seatback bolster. Preferably at least one fluid distributor is provided on the A side, in order, by means of a tempering device, to move tempered air on the shorted path to a passenger. This permits full functionality of the fluid collector with simultaneous optimal function of a fluid distributor. What is appropriate is a shape that makes possible low flow resistance and simplified assembly. This especially includes an X-shaped air direction layer encased in fleece or foil.

Fluid channel attachment means an opening of a fluid exchange device at which a fluid guidance device is attached, to connect the fluid exchange device with a fluid transport device. Examples are a circular or rectangular opening or an elongated opening with rounded ends. A number is appropriate by which both a seatback and a seat bolster are sufficiently supplied. This especially includes one fluid channel attachment per fluid exchange device. Preferably at least one fluid channel attachment is provided at an opening in a sheathing device on a B side of a fluid exchange device, for each attachment of a fluid transport device. Preferably at least one fluid channel attachment is provided on an opening at the intersection point of a T or X shaped fluid exchange device, even where multiple legs are present. This additionally includes an opening at the bottom of a U-shaped fluid exchange device. In addition this means an opening at the connection point of a forked fluid exchange device. This also includes a central opening in the linear-shaped fluid exchange device. This additionally includes an opening at the end of the linear-shaped fluid exchange device.

Fluid exchange opening 40 means an opening in a fluid exchange zone, via which air can flow through into or out of a cover, to exchange air on the one side between a fluid exchange device and the area surrounding a passenger. This makes it possible to have tempered air flowing at a user, or to remove by suction undesired conditioned air from the area surrounding a person. Examples are perforations in a seat cover, pores or fiber interstices in a textile or recesses in a sheathing device of a fluid exchange device. This especially includes a fluid ejection opening 40 or a fluid intake suction opening 41. A number is appropriate by which both a seatback and a seat bolster are sufficiently supplied. Examples are 2 to 10 per fluid exchange zone or per fluid exchange device. Preferably at least one fluid exchange opening is provided on an A side of a fluid exchange zone or a fluid exchange device, for as efficient as possible air exchange of a ventilation device with a passenger. Preferably at least one fluid exchange opening is provided at a distance from an intersection point of a T or X-shaped fluid exchange device, from a bottom of a U-shaped fluid exchange device, from a connection point of a forked fluid exchange device or generally from a fluid channel attachment. This permits as homogeneous as possible a fluid flow through an entire fluid exchange zone. The size of a fluid exchange opening should ensure an efficient fluid guidance and effective tempering. For this, the number, individual size and overall surface of all fluid exchange openings of a fluid exchange device relative to another fluid exchange device preferably correspond to principles described for surface size of fluid exchange zones.

Fluid ejection opening means a fluid exchange opening, via which air flows out from a fluid blowout device to the passenger.

Fluid suction intake opening means a fluid exchange opening via which air is brought away from the passenger via a fluid suction intake device.

Heater means a device for heating of a target zone, thus a device that makes thermal energy available for specific heating of its surroundings, and releases it to its surroundings conductively, convectively, or through thermal radiation. This permits rapidly-acting or long duration heating of a user, or heating of an object to be heated, especially the inner space of a housing. Examples are devices with at least one electrical resistance heater, a flexible textile flat heating element, a heat pump, a TED fan, a PTC heating blower, a radiator, a convector or a heating filament. This especially contains a flat heating element, which is placed at least partially over an air distributor or in a fluid outflow zone. By this means, heated air can be transported toward the user and better used than with placement of the heating element above a fluid suction removal zone. Especially preferred, as an alternative to that, a PTC heat blower is integrated at a position described for a TED fan. Preferably at least one heating device has at least one tempering strand, a resistance heater, and a resistance heater carrier.

Resistance heater means an electrical resistance device, the thermal energy of which, when current flows through, serves directly or indirectly to heat an air conditioner controlled system. For example, there can be a single- or multi-wired conductor with individual strands at least partially insulated from each other, for example paint-insulated strands with a copper or steel component, metal wires, carbon fibers, conducting yarn, or PTC material. The thermal resistance device can be attached to the thermal resistance device carrier by sewing, laying or knitting. Preferably at least one heating device has at least one thermal resistance device.

Thermal resistance device carrier means a device for mechanical unloading of a thermal resistance device or for securing its spatial position. Especially suited are flexible flat articles, preferably consisting at least in part of a textile, fabric, a knit, texture, fleece, bendable thermoplastic, stamped or knurled foil, air-permeable material or the controlled system itself. Preferably the at least one resistance heating device carrier has at least a plurality of fibers.

TED module means an assembly that combines at least one TED and at least one fan, to generate a first air flow with air at a desired temperature and a second air flow with tempered exhaust air deviating from the first air flow. Preferably at least one TED module is provided close to a cover, especially on an A side of a bolster, especially in the plane of same like a fluid blowout device. This permits an efficient transfer of the heating or cooling power of the TED module. Preferably the at least one TED is provided in areas in or beneath a bolster, to reduce space consumption. For efficient transfer of heating or cooling power of the TED module, it is appropriate to provide a connection of a utility side of a TED module with a fluid blowout device. To save on components and to reduce ventilator noises, it is advantageous to create a connection of a suction intake attachment of a TED module with a fluid intake device. Preferably the at least one TED module has at least one TED, a secondary removal device 45 and a fan 46.

TED means a thermoelectric device.

Thermoelectric device means an electrical device which contains a minimum of one Peltier element or a Seebeck element.

Peltier element means a flat semiconductor element which, when an electrical current is applied, heats on one side and cools on an opposite side. Seebeck element means a flat semiconductor element which, when heating one side and cooling an opposite side, generates an electrical current.

The utility side means a side of a thermoelectric device, a Seebeck element or a Peltier element, which in a viewed operational state is provided for exchange of thermal energy with a target zone, in order to provide heat or cooling for this, or to draw up their thermal energy for generation of electrical energy.

Compensation side means a side of a thermoelectric device, of a Seebeck element or of a Peltier element, which in a viewed operational state, is provided for exchange of thermal energy with a surrounding environment, in order to direct waste heat of the thermoelectric device into the environment, or to bring ambient heat to the thermoelectric device.

Secondary removal device 45 means a device for removal of a secondary stream of a fluid, which was impinged on by exhaust heat on a compensation side of a TED or from which usable heat was withdrawn there. Examples are a channel made of plastic or polymeric foam, which directs exhaust air from a TED to one side of a seat and there ejects it via an air exchange opening. The air exchange opening is preferably provided at shoulder height or at a middle level of the seatback, and covered by a grid or a fabric (FIG. 4).

Fan means an air transporting device, to supply an air flow to the utility side or the compensation side, or both, of a TED. Examples are axial or radial ventilators. Preferably the at least one fan has an acoustic protection device, especially a coating with an at least partially foamed polymeric material or fleece.

Operating mode means a heating, ventilating or cooling mode, in which at least one component of an air conditioner device is active. Examples are especially the operational states described as follows.

Heating mode means an operational state in which thermal energy is fed to the at least one air conditioning zone.

Cooling mode means an operational state in which thermal energy is removed from the at least one air conditioning zone.

High-power cooling mode means a cooling mode for an air conditioning zone with a fluid blowout device, a fluid transporting device and a cooling device. With this, the cooling device delivers at least 80% of its cooling power and the fluid transporting device transports less than its maximum possible transport amount. Especially preferred is a cooling power of at least 90%, better 100%. Especially preferred is a TED fan as a cooling device. Especially preferred is a fluid transport amount of at most 90% of the maximum possible transport amount, better 80%, and better 70%. This generates a quickly perceptible effect. The overall cooling effect may be less than with the maximum fluid transporting power. The resulting tempered air has a particularly low temperature, true. In addition, a ventilator is quieter when not operated at its full r.p.m.s.

Multi-value tempering means an operational state in which another target temperature value is assigned to a first air conditioning zone than a second air conditioning zone, or in which at least a first air conditioning zone is run in a heating mode and at least one second air conditioning zone is run in a cooling mode.

Reverse operation means an operating mode in which at least one fluid blowout device brings air in by suction instead of blowing it out, or in which at least one fluid suction intake device blows air out instead of drawing it in, to further increase the functional capacity of the air conditioner device.

Selective mode means an operating mode in which the at least one user has deliberately chosen at least one of a plurality of air conditioner zones as well as its operational mode, independent of at least one additional air conditioning zone.

This especially includes an operating mode in which a first conditioning zone is deliberately activated and a second air conditioning zone is purposefully not activated. This additionally includes an operating mode in which a first air conditioning zone and a second air conditioning zone are selected at times differing from one another. This additionally means an operating mode in which the user has selected the fluid transport power in at least one fluid exchange zone independent of its target temperature or its type of tempering operation.

Independent transport operation means an operating mode in which a) at least one fluid exchange device exchanges air with the surroundings and b) at least one additional fluid exchange device is inactive, or its transport volume is throttled vis-à-vis its maximum performance capability. This permits the available ventilation and tempering power to be focused on individual fluid exchange devices, so as to be more quickly perceptible, or to not run certain fluid exchange devices, in order to avoid local temperature extremes. This especially includes two fluid exchange devices, to each of which its own fluid transporting device is assigned, and in which one of the fluid transporting devices transports with reduced power. This in addition includes two fluid exchange devices, each of which is connected via a connection line with a common fluid transporting device. In one of the connection lines, a flow modifier is placed, which modifies a fluid exchange via this connection line. Preferably for this it at least in part uncouples the fluid exchange device assigned to it from the fluid transporting device, for example by at least in part producing an alternative connection to the surroundings, for example by drawing one of the fluid flows transported by the fluid transport device to a place other than the fluid exchange device. Or by bringing one of the fluid flows drawn by suction from the fluid transporting device at another location than the fluid exchange device. For this especially, ventilation valves and regulating cocks are suitable.

Combined transport operation means an operating mode in which at least two fluid exchange devices simultaneously exchange air with their surroundings.

Circulating transport operation means an operating mode in which a) at least one fluid exchange device exchanges air with the surroundings and simultaneously b) at least one additional fluid exchange device operates in an air transport direction that is the reverse thereof. This corresponds to a state in which a) at least one fluid exchange zone exchanges air with the surroundings, and simultaneously via b) at least one additional fluid exchange zone causes air to flow in a fluid exchange direction that is the reverse thereof. This especially includes the operation of a first fluid exchange device as a fluid blowout device, and of a second fluid exchange device as a fluid intake device. Through the first fluid exchange zone, air, for example, is thus blown out on an A side of a vehicle seat to the surroundings, or brought in by suction, and simultaneously, opposite thereto, air is brought through the second fluid exchange zone on the A side of the vehicle seat to the seat, or blown out. For this, in at least one operating state, at least one of the fluid exchange zones is attached at a fluid inlet of a fluid transporting device, and at least one second fluid exchange device is attached to a fluid outlet of a fluid transporting device.

Focused tempering operation means an operating mode in which at least a first air conditioning zone exchanges thermal energy with the surroundings, because a tempering device is assigned to it and it is activated, and at least one second air conditioning zone, to which no tempering device is assigned, or which is not activated, exchanges no thermal energy with the surroundings. This especially includes an operating mode in which a first air conditioning zone is impinged on by cooled air of a cooler, and in which at least a second air conditioning zone is only ventilated or provided with low-power cooling (as compared to its maximum power capability or to the first air conditioning zone). This also includes an operating mode in which a first air conditioning zone is heated or impinged on with heated air of a heating device, and in which at least a second air conditioning zone is only ventilated or is inactive. This in addition means an operating mode in which one tempering device of a first air conditioning zone is operated at its maximum power stage, for example a cooler with its maximum cooling power.

Multi-zone tempering operation means an operating mode in which at least two air conditioning zones are simultaneously tempered. Examples are arrangements in which at least two fluid exchange devices exchange air with their environment, preferably at full tempering or fluid transport power. This is especially preferred for long-duration operation.

Diagonal ventilation means a method of ventilation in which a first air conditioning zone in a first bolster exchanges air with a second air conditioning zone in a second bolster. This especially includes a ventilation for an arrangement with a first air conditioning zone in a seatback bolster and a second air conditioning zone in a seat bolster, preferably with one blowout zone in the seatback and one suction zone in the seat cushion, preferably with at least one nozzle as part of the blowout zone.

Screening ventilation means a method for ventilation in which tempered air blown toward the passenger is again brought in by suction, before it can move out laterally via the edges of air conditioning zones of the object being air conditioned. "Laterally" here relates to the level of the particular air exchange zone. By this especially are meant the lateral edges of the A side relative to a passenger, additionally the upper and lower edge of the seatback and the front and rear edge of the seat surface. This especially includes a ventilation for an arrangement with a blowout zone, which is delimited by an intake zone assigned to that same bolster of at least one edge of a seat surface. Especially preferred is at least a partial delimitation of a blowout zone on at least two, three or four sides.

Central ventilation means a method for ventilation of a seat, in which at least one blowout zone and at least one intake zone per seat bolster and per seatback bolster are operated by a single air transporting device. This especially includes a ventilation for an arrangement in which at least one blowout zone and at least one intake zone of at least one seat bolster and at least one blowout zone and at least one intake zone of at least one seatback bolster are linked at least at times exclusively with a single air transporting device.

Common intake by suction means a method for ventilation of a seat in which at least two intake zones are operated by a single air transporting device. This especially includes a ventilation for an arrangement in which at least one intake zone of at least one seat bolster and at least one intake zone of at least one seatback bolster are connected at least at times exclusively with a single air transporting device.

Common blowout means a method for ventilation of a seat in which at least two blowout zones are operated by a single air transporting device. This especially includes a ventilation for an arrangement in which at least one blowout zone of at least one seat bolster and at least one blowout zone of at least one seatback bolster are connected at least at times exclusively with a single air transporting device.

Central ventilation means a method for ventilation of a seat in which at least one blowout zone and at least one intake zone per seat bolster and per seatback bolster are operated by a single air transporting device. This especially includes a ventilation for an arrangement in which at least one blowout zone and at least one blowout zone of at least one seat bolster and of at least one seatback bolster are connected at least at times with a single air transporting device. This especially includes common intake by suction, common blowout or diagonal ventilation.

Operating method means a method for heating, ventilating or cooling, with a sequential or simultaneous implementation of at least two operating modes.

Rapid cooling method means a method for cooling in which at least two air conditioning zones are cooled or ventilated, first in a focused tempering operation, and then switched over into a multi-zone tempering operation, in order to provide uniform cooling of the air conditioned zones in a long-duration operating state. This especially includes a tempering of a first air conditioning zone to a temperature value of T1 and then tempering of a second air conditioning zone to that same temperature value T1.

Rapid heating method means a method for heating in which at least two air conditioning zones are cooled or ventilated, first in a focused tempering operation, and then switched over into a multi-zone tempering operation, in order to provide uniform heating of the air conditioned zones in a long-duration state. This especially includes a tempering of the second air conditioning zone (related to the prior rapid cooling method) to a temperature value T2 and then tempering of the first air conditioning zone to that same temperature value T2.

Amplified focusing means a method for tempering in which circulating transport operation and focused tempering operation are introduced simultaneously. This especially includes a tempering of the first air conditioning zone by blowing out of tempered air, then subsequent induction again in a second air conditioning zone, and reuse in the first air conditioning zone.

| Reference Symbols | | | |
|---|---|---|---|
| 1 | Vehicle | 22 | Sheathing device |
| 2 | Body support device | 23 | spacer device |
| 3 | Vehicle seat | 24 | fluid |
| 4 | Seat cushion | 25 | fluid transporting device |
| 5 | Seatback | 26 | fluid guidance device |
| 6 | arm rest | 27 | connection line |
| 7 | bolster | 28 | suction intake line |
| 8 | A side | 29 | blowout line |
| 9 | B side | 30 | fluid exchange zone |
| 10 | cover | 31 | fluid blowout zone |
| 11 | anchoring trench | 32 | fluid intake zone |
| 12 | Air conditioner zone | 33, 33' | fluid exchange device |
| 13 | moderate cooling zone | 34 | fluid ejection device |
| 14 | high cooling zone | 35 | fluid intake device |
| 15 | moderate heating zone | 36 | fluid collector |
| 16 | high heating zone | 37 | fluid distributor |
| 17 | air conditioner device | 38 | fluid channel attachment |
| 18 | tempering device | 39 | fluid exchange opening |
| 19 | cooling device | 40 | fluid ejection opening |
| 20 | ventilation device | 41 | fluid intake opening |

-continued

| | Reference Symbols | | |
|---|---|---|---|
| 21 | free space | 42 | heating device |
| 43 | TED module | 45 | secondary removal device |
| 44 | Thermoelectric device | 46 | fan |

The invention claimed is:

1. An air conditioner configured for a vehicle seat, the air conditioner comprising:
 a fluid transport device;
 a first fluid exchange device comprising a first conduit comprising at least one intake opening; and
 a second fluid exchange device comprising two spaced apart second conduits each comprising at least one ejection opening;
 wherein the fluid transport device has at least two attachment openings, of which one is a fluid inlet and another one is a fluid outlet,
 wherein the first fluid exchange device is attached to the fluid inlet of fluid transport device, and the second fluid exchange device is attached to the fluid outlet of the fluid transport device, and
 wherein the fluid transport device is configured to expel fluid from an A-side of the vehicle seat through the at least one ejection opening defined in each of the two spaced apart conduits of the second fluid exchange device while also drawing fluid into the A-side of the vehicle seat through the at least one intake opening defined in the first conduit of the first fluid exchange device;
 wherein the first conduit extends into a region that is defined in between the two spaced apart conduits;
 wherein the first fluid exchange device has a W-shaped structure; and
 wherein at least one of the two spaced apart second conduits is arranged within the W-shaped structure.

2. The air conditioner according to claim 1, wherein the fluid transport device is positioned in the vehicle seat such that the fluid transport device is free of an intake opening and a blowout opening at a B-side of the vehicle seat.

3. The air conditioner according to claim 1, wherein at least one of the first and second fluid exchange devices comprise a generally hollow body.

4. The air conditioner according to claim 1, wherein the at least one intake opening is coplanar with the at least one ejection opening.

5. The air conditioner according to claim 1, wherein the air conditioner comprises at least one TED provided on the A-side.

6. The air conditioner according to claim 1, wherein the second fluid exchange device has a U-shaped structure.

7. The air conditioner according to claim 1, wherein the air conditioner comprises a fluid guidance device for directing the fluid between the fluid transport device and one of the first and second fluid exchange devices.

8. The air conditioner according to claim 1, wherein the first fluid exchange device and the second fluid exchange device have a standard operation mode and a reverse operation mode; and
 wherein in the standard operation mode, the first fluid exchange device pulls the fluid and the second fluid exchange device pushes the fluid, and in the reverse operation mode, the first fluid exchange device pushes the fluid and the second fluid exchange device pulls the fluid.

9. The air conditioner according to claim 1, wherein the first fluid exchange device comprises two additional conduits that are arranged generally parallel to the first conduit.

10. The air conditioner according to claim 9, wherein the two spaced apart second conduits of the second fluid exchange device are arranged between the two additional conduits of the first fluid exchange device.

11. The air conditioner according to claim 1, wherein the first conduit is generally parallel to the two spaced apart second conduits of the second fluid exchange device.

12. The air conditioner according to claim 1, wherein each of the two spaced apart second conduits are arranged within the W-shaped structure.

13. The air conditioner according to claim 12, wherein the first fluid exchange device and the second fluid exchange device are located in a backrest of the vehicle seat.

14. The air conditioner according to claim 1, wherein the first fluid exchange device comprises three of the first conduits that are generally parallel to the two spaced apart second conduits of the second fluid exchange device.

15. The air conditioner according to claim 1, wherein the first conduit is arranged side-by-side with the two spaced apart second conduits.

* * * * *